Jan. 29, 1957  R. A. KIZZEK  2,779,554
BALLOON AND FITTING FOR SECURING BALLOON ENDS
Filed Nov. 3, 1954  3 Sheets-Sheet 1

INVENTOR.
ROGER A. KIZZEK
BY
William C. Stueber
ATTORNEY

Jan. 29, 1957 R. A. KIZZEK 2,779,554
BALLOON AND FITTING FOR SECURING BALLOON ENDS
Filed Nov. 3, 1954 3 Sheets-Sheet 2

INVENTOR.
ROGER A. KIZZEK
BY
William C. Stueber
ATTORNEY

Jan. 29, 1957   R. A. KIZZEK   2,779,554
BALLOON AND FITTING FOR SECURING BALLOON ENDS
Filed Nov. 3, 1954   3 Sheets-Sheet 3
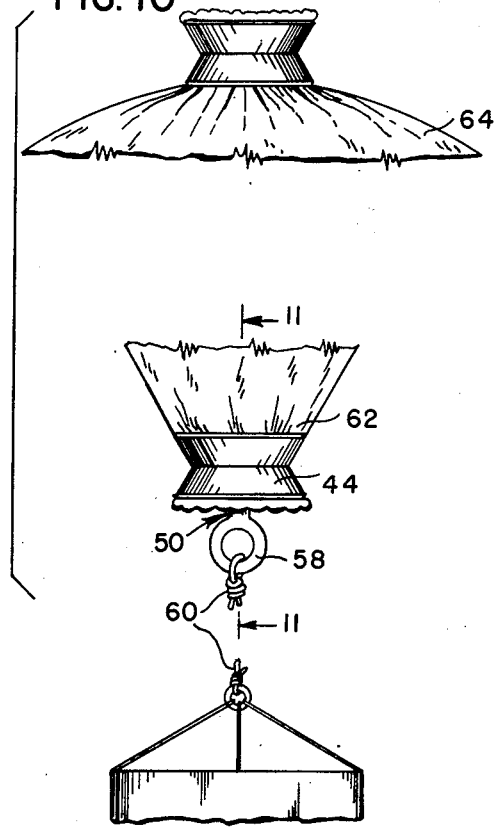
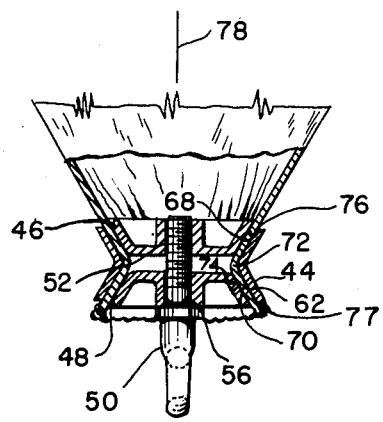
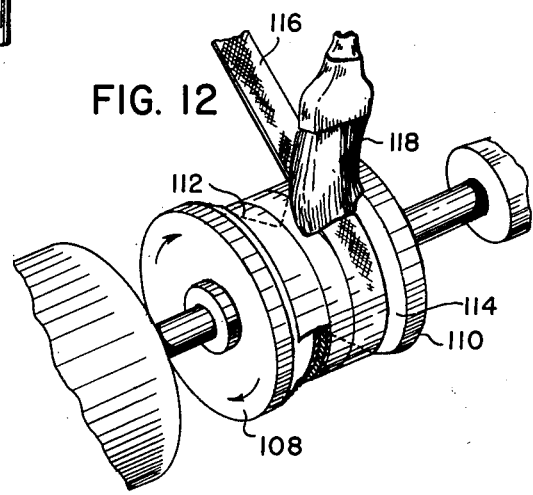
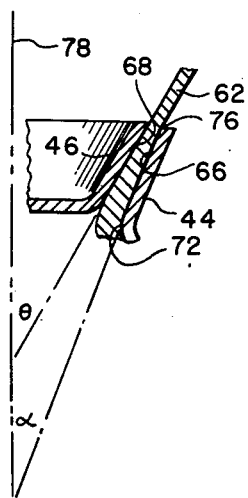
INVENTOR.
ROGER A. KIZZEK
BY
William C. Stueber
ATTORNEY United States Patent Office 2,779,554
Patented Jan. 29, 1957

2,779,554

BALLOON AND FITTING FOR SECURING BALLOON ENDS

Roger A. Kizzek, Minneapolis, Minn., assignor to General Mills, Inc., a corporation of Delaware Application November 3, 1954, Serial No. 466,627

15 Claims. (Cl. 244—31)

This invention relates to improvements in balloons and fittings for securing the ends of a balloon and more particularly to balloon and end fittings for securing either the bottom or top of a tapeless cylindrical type balloon.

Developments in the balloon art have made possible high altitude balloon flights with substantial payloads using light weight thermoplastic material. Materials such as polyethylene have a very low permeability to gas and are not affected by low temperatures encountered in high altitudes.

To achieve good rates of rise and optimum performance balloons have been made streamlined in shape. One method of making these balloons is to cut a series of elliptically shaped gores and join them along the seams to form a tear-drop shaped balloon envelope. To support the load on this balloon tapes are placed over the seams and connected either directly to the pay-load bottom or to a load supporting ring. These tapes distribute the weight of the load over the balloon surface and strengthen the balloon seams.

It has been found that for many purposes the balloons may be formed of an envelope of cylindrically shaped material, the ends of which are gathered and connected to means for supporting the load. The cylindrical balloon envelope has sufficient material on the upper and lower end to support the weight of the payload without the addition of load supporting tapes. This type of balloon, which may be referred to as the tapeless or cylindrical balloon, avoids the extra weight of the tapes and is cheaper to construct, making unnecessary the extra steps of carefully joining the balloon gores and adding the tapes.

A modification of this cylindrical type balloon utilizes some shaped gores but the balloon envelope does not taper to a point on the end and enough material is provided at the upper and lower end of the balloon to support the payload without the addition of load tapes. This type of balloon may be termed the modified cylinder or tailored balloon but also may be generally referred to as a cylindrical type balloon. In these cylindrical type balloons one manner of securing the ends is by bringing them to a concentrated point and clamping them in the manner taugh by the co-pending application, Balloon and Fitting for Balloon Ends, Froehlich.

The present invention has for one of its objects the provision of an improved end fitting for a cylindrical type balloon which will close the end of the balloon by clamping the material at a point and provide means of attaching the load to the balloon.

A further object of the invention is to provide an improved balloon end fitting which may be used for closing either the top or the bottom end of the balloon.

Another object of the invention is to provide a fitting for securing the end of a cylindrical balloon which clamps over a substantial area of the balloon material to thereby more firmly grip the material to lessen the danger of the fitting slipping off the balloon end and also to lessen the danger of causing stress concentrations in the material due to clamping.

Another object is to provide an end fitting for a cylindrical type balloon which is economical to manufacture and easy and efficient to use in the field and which securely clamps the balloon ends without gas leakage.

Other objects and advantages will become apparent in the following specification and claims taken in connection with the drawings in which:

Fig. 10 is a perspective view of a balloon with the end fittings attached;

Fig. 11 is a sectional view taken along line 11—11 of Fig. 10;

Fig. 12 is a perspective view of an alternate form of the end fitting and the illustration of the method of making this fitting; and Fig. 13 is an enlarged sectional view showing a portion of Fig. 11 to illustrate the relative angles between the end fitting elements.

Figure 4:
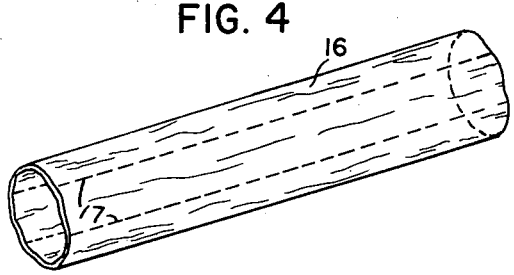
Fig. 4 is a perspective view illustrating a tubular type balloon envelope suitable for using the end fitting of the present invention.
Figure 5:
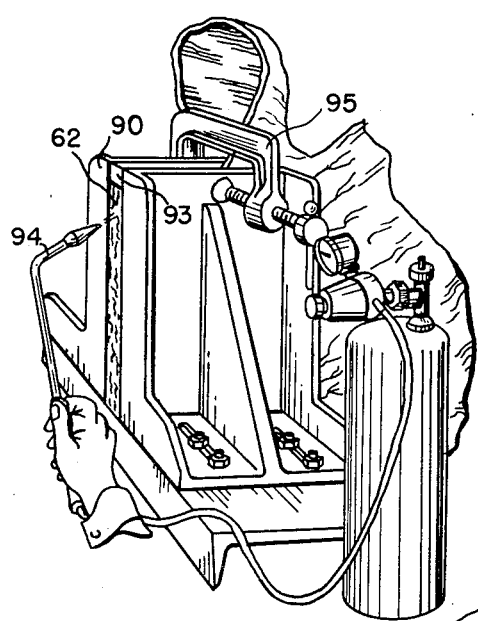
Fig. 5 is a perspective view illustrating the method of preparing the balloon and prior to attaching the end fitting of the present invention.

The end fittings of the present invention are adapted to fit a simplified inexpensive balloon of the cylindrical type, the balloon envelope being shown at 16 in Fig. 4. The envelope shown is generally cylindrical in shape being of light weight thermoplastic either extruded from dies in manufacturing or fabricated from lengths of rectangular material joined to each other by seams. If the material is thermoplastic, such as polyethylene, the seams are easily made by a heat seal. The cylindrical envelope of Fig. 4 is formed of rectangular gores which are joined by seams shown generally by the dotted lines 17.

Figure 1:
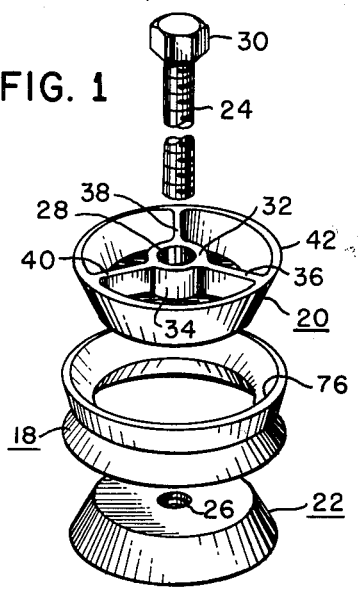
Figure 1 is a perspective exploded view of the end fitting which may be used for the top of a balloon.
Figure 2:
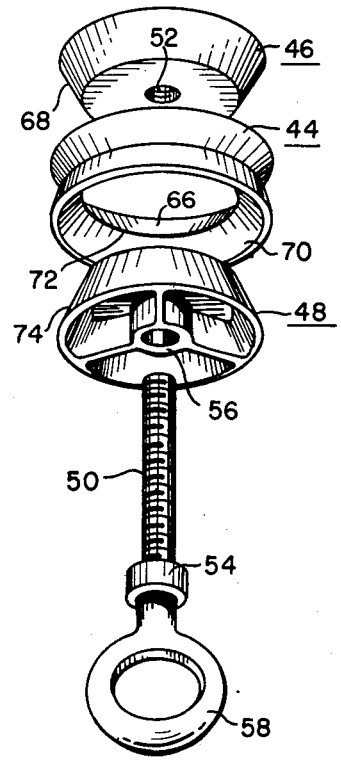
Fig. 2 is a perspective exploded view of the fitting which may be used to close the bottom end of a balloon.

To complete the balloon from the envelope shown, the ends are gathered and clamped to prevent gas leakage, the ends being gathered together at a concentrated point as taught by the co-pending application, Balloon and Fitting for Balloon Ends, referred to above. In Figs. 1 and 2 the fittings for clamping the top end and bottom end of the balloon are shown.

The top fitting for the balloon in Fig. 1 consists of an annular holding ring 18 with the top and bottom clamping members 20 and 22 which press the balloon material tightly against the inner surface of the ring to seal the balloon. The clamping members are frustum shaped and when installed on a balloon, their small ends extend into the ring to force the balloon material against the ring with a wedging action. To clamp the material at the upper end of the balloon, material is drawn through the center of the ring and the two clamping members 20 and 22 are drawn tightly together, the member 22 being inside the balloon. For this purpose a bolt 24 extends axially through holes 28 and 26 in the upper and lower clamping members, passing through the center of the annular holding ring 18. To draw the clamping members together the lower clamping member is threaded and when the bolt is tightened it draws the clamping members together. The holes in the clamping members are centrally located in the hub of the member. Member 20 has a hub 34 with a flat outer surface 32 against which the head 30 of the bolt 24 bears. Clamping member 22 has a similar hub and flat surface (not shown).

Each of the clamping members has reinforcing webs as shown in member 20 at 36, 38 and 40 which lend strength to the clamping member with a minimum of weight which is so important in appliances to be used with a balloon. The webs extend radially from the central hub 34 to the outer flange 42 of the clamping member.

The lower clamping member 22 is similarly constructed with webs which are not shown. In Fig. 2 the clamping member assembly for the bottom end of the balloon is shown. It will be noted that the elements of this clamping member are of substantially the same size and shape as the elements of the upper clamping member so that they may be used interchangeably, thus reducing manufacturing costs. For the purpose of reducing the balloon weight, the clamping elements of Figs. 1 and 2 are preferably made of a light metal such as aluminum.

The balloon fitting for the lower end of the balloon has an annular holding ring 44 with upper and lower clamping members 46 and 48. The holding ring 44 corresponds to ring 18 for the upper end of the balloon and the clamping members 46 and 48 correspond to members 20 and 22. These clamping members are also frustum shaped and when installed on a balloon their small ends project into the ring to force the material against the inner surface of the ring.

The bolt for drawing the clamping members together against the holding ring is different from that used in the balloon top end fitting. Bolt 50 draws the clamping members 46 and 48 together against the annular ring and for this purpose is threaded to turn into the threaded clamping member 46 which has a threaded hole 52 through its center. Near the lower end of the bolt 50 is a washer or collar 54 which bears against the lower flat surface of the hub 56 of the clamping member 48 for forcing the clamping members together. At its lower end bolt 50 is provided with an eye 58 to which the load line 60 is secured in the manner illustrated in Fig. 10.

When the end fittings are installed on the balloon they clamp the balloon material in the manner illustrated in Figs. 10 and 11 and the manner of attaching the fittings to the balloon will later be described in connection with Figs. 5–9.

The upper and lower clamps secure the balloon ends in substantially the same manner so that the relationship between the fitting and the balloon need be described with respect to one end only and the lower end will be described.

In Fig. 11 the lower fitting is shown clamping the material of the lower end 62 of the balloon 64. The material of the lower end is carefully and evenly pleated and extends through the center of the holding ring 44. The upper clamping member 46 is located within the balloon and presses the pleated balloon material 62 downwardly against the holding ring. The lower clamping member 48 is outside the balloon and presses the pleated balloon material upwardly against the holding ring.

The load supporting bolt 50 extends upwardly through central hole 56 in the lower clamping member and is threaded into the hole 52 in the upper clamping member. By threading the bolt 50 tightly in the upper clamping member the members are drawn together to force the balloon material outwardly against the holding ring 44.

The holding ring and clamping members are provided with clamping surfaces which hold the balloon material with a uniform even pressure so that leakage of the gas from the balloon will be prevented and so that the fittings are tightly secured on the balloon. Since thermoplastic materials such as polyethylene are somewhat slippery in nature, it is important that the end fitting be firmly attached to prevent it from sliding off the balloon end.

The fitting for the lower end of the balloon includes the upper half of the inside of the holding ring 44 which has a surface 66 diverging outwardly in the shape of a frustum of a cone. The upper clamping member has a cooperating surface 68 which converges downwardly to form the frustum of a cone. The holding ring 44 has a similar lower frustum shaped surface 70 on its lower half which diverges downwardly. The upper and lower surfaces 66 and 70 meet at a ridge 72.

The frustum shaped surface 74 of the lower clamping member 48 converges upwardly and presses the balloon material smoothly against the surface 70 of the ring.

It will be apparent from Fig. 11 that the gathered material at the ridge or center 72 of the holding ring must be squeezed into a smaller diameter than the material at the outer edges 76 or 77 of the holding ring and therefore the material will be thicker at the center 72 of the ring. Thus the thickness of the gathered material becomes uniformly less moving from the ridge 72 to the outer edges 76 and 77. To insure that the end fitting grips the material uniformly, the taper of the outer surface 68 of the upper clamping member is different from the inner surface 66 of the ring.

Since the material will be less thick at the outer edge 76, Figs. 11 and 13, of the ring than at the center ridge 72, the distance between the surface of the ring and the surface of the clamping member must be less at the top or at the bottom edge of the ring than near the center of the ring. This is accomplished by constructing the end fitting members so that the angle $\theta$, Fig. 13, which is the angle between the balloon axis 78 and the face 68 of the clamping member, is greater than the angle $\alpha$ between the balloon axis and the inner surface 66 of the ring. These angles may be readily computed by mathematically determining the difference in the thickness of material due to the change in diameter from the center of the ring to the upper or lower edge.

This same difference in angle between the face of the upper clamping member and the holding ring as shown in Fig. 13 exists between the lower inner face 70 of the holding ring and the outer face 74 of the clamping member, Fig. 11. The angle between the outer face of the clamping member 48 and the balloon axis is greater than the angle between the inner lower face 70 of the holding ring and the balloon axis.

Thus with the construction above described, the pleated gathered balloon material is clamped with uniform pressure by the end fitting and this structure results in not only a gas tight seal but a firm gentle bond between the fitting and the lower end of the balloon which holds the end fitting snugly to the balloon to support the load, and prevents individual balloon folds from slipping.

As an example of the features discussed above, the following are the pertinent meaurements of a balloon and end fitting which were flown:

Balloon:
　Envelope: Polyethylene, .002 inch thick; cylindrical shape, 17 gores each 104 inches wide.
　Diameter: 45 feet.
　Length: 68 feet.
　Weight: 115 pounds.
　Payload: 500 pounds.
　Maximum altitude: 50,000 feet.
　Angle of lower end of inflated balloon: 38°.

End fitting:
　Minimum inside diameter of ring: 3⅝ inches.
　Ring height: 2 inches.
　Angle of ring inside surface: 30°. ($\alpha$ in Fig. 13.)
　Angle of clamping member surfaces: 38°. ($\theta$ in Fig. 13.)
　Cone height: 1 inch.
　Area of material clamped by end fitting: 3.536 inches.

Thus the difference in angle between the clamping members and the ring enables the fitting to clamp the material with uniform pressure over the entire clamped surface despite the fact that the material is of different thickness when being clamped on an angular surface. The advantage of the angular surface will be especially noted because the angle of the upper clamping member and the balloon material are the same. The fitting clamps the material at the natural angle of the balloon and no stresses are caused by the material being bent around the edges of the fitting. The specifications above given have been found to be ideal and considerable advantages are obtained with a fitting constructed to the measurements given.

Figure 3:
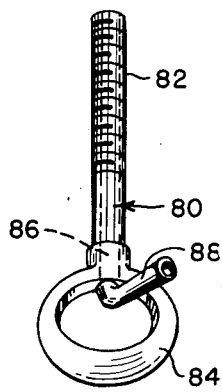
Fig. 3 is a perspective view of an alternate form of the bolt to be used on the lower fitting and which is adapted to being used as an inflating member.

In Fig. 3 an alternate form of the load supporting bolt 50 of Fig. 2 is shown. The bolt 80 of Fig. 3 has a threaded end 82 to thread into the upper element 46 of the clamping member to draw the clamping members 46 and 48 together. This bolt also has a load supporting eye 84 from which the payload may be supported. An axial bore 86, however, extends through the center of the bolt to provide a passageway leading to the interior of the balloon for inflating the balloon envelope. The lower end of this bore connects to a pipe 88 through which gas may be inflated. After inflation this pipe or tube 88 may be tied off or plugged to hold the gas in the balloon.

Thus when the fitting is in place and the load is connected to the balloon, inflation of the balloon may take place without the provision of additional inflation means or without having to remove or adjust the balloon end fittings.

Figure 6:
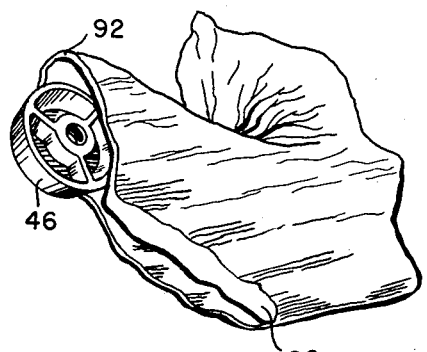
Figs. 6–9 are perspective views illustrating successive steps of attaching the end fitting member to the balloon.
Figure 7:
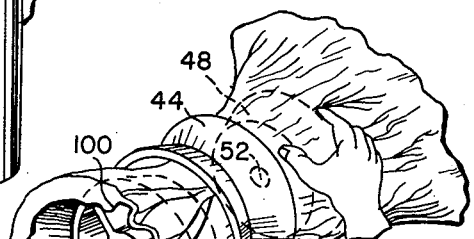

With reference to Figs. 5–9, a preferred method of attaching the present fitting to the balloon is illustrated. The lower end 62 of the balloon material is first pleated by being pressed between a pair of guides 90. One loop 92 of the material, as is shown in Fig. 6, is left out from between the guides to form an opening for inserting the upper clamping member 46 into the balloon. The material is all forced between the guides with the loop 92 extending from the rear of the guides and the material is then held between the guides by a block 93 placed between the guides and a C-clamp 95 holds the block in place.

With material 62 tightly clamped, a torch 94 may be used to weld the thermoplastic material. This welded material forms a heavy seam 96 as is shown in Fig. 6. The upper clamping member 68 of the fitting is then inserted into the balloon through the unsealed loop 92. The heavy seam 96 is then pressed into arcuate shape as shown in the manner in Fig. 7 and inserted through the holding ring 44.

The lower clamping member 48 is then pressed into place against the lower side of the holding ring and the load supporting bolt 50 is inserted through the hole in the lower clamping member and threaded into the hole 52 in the upper clamping member. When the bolt is threaded up tight the clamping members 46 and 48 are drawn tightly against the holding ring 44 to clamp the balloon material tightly. The ends 98 and 100 of the heavy seam 96 are drawn together with the unseamed material 92 pleated between them.

Figure 8:
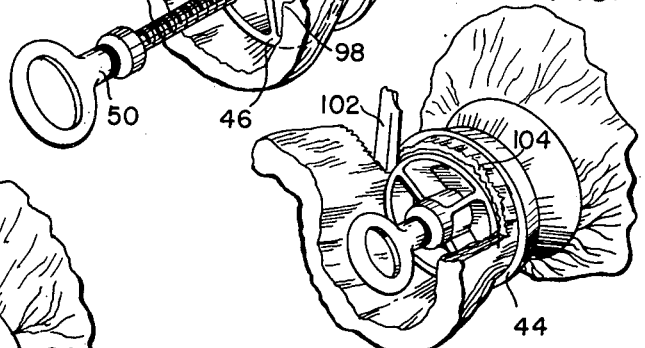
Figure 9:
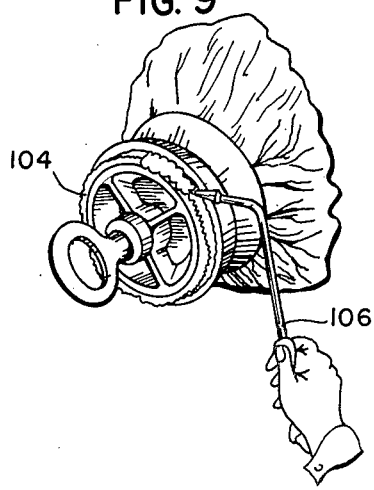

The excess material 44 which projects beneath the holding ring is then cut off such as by a knife 102 in the manner shown in Fig. 8 and the raw cut edge 104 of the material is seamed by a torch 106.

This method and apparatus for seaming the top or bottom edge of the balloon and applying the fitting is shown and described in my co-pending application, Method and Apparatus for Securing Balloon Ends.

In Fig. 12 is illustrated a method of making an inexpensive light weight holding ring similar to the rings 18 and 44 shown in Figs. 1 and 2. The ring of Fig. 12 is made of fiber glass which has a high tensile strength when made in the manner shown in the drawing.

To form the fiber glass ring a pair of wood dies 108 and 110 are provided having tapering converging inner surfaces 112 and 114. The two dies are placed with their centers together so that when a length of fiber glass tape 116 is wound thereon the roll formed will have inner surfaces shaped the same as the surfaces of the dies 112 and 114. These inner surfaces will correspond in taper to the inner surfaces of the metal rings shown in Figs. 1 and 2.

To cause the fiber glass tape to adhere together and form a monolithic structure, an adhesive is applied as the tape is rolled on the die such as by a brush 118. This adhesive coats the upper face of the tape and penetrates it thereby forming a strong unitary structure.

The fiber glass ring formed as above described may be used with the clamping members such as 46 and 48, or for purposes of economy, similarly shaped wood blocks may be used. Since the fiber glass ring has resilience which is not present in the metal ring, the ring will deflect slightly to conform to any irregularities in the wood blocks to relieve concentrations of pressure. Thus with this fiber glass ring the wood blocks have sufficient strength to tightly clamp the balloon material. With wood blocks it will be recognized that the upper clamping member cannot be threaded but instead a nut will be turned on the end of the bolts that draw the clamping members together.

The improved fittings above described clamp the balloon material securely with a uniform pressure and have no sharp corners or edges which would weaken the balloon material. It will be observed in Figs. 10 and 11 that the balloon material enters the fitting at the natural angle of the balloon so that no concentrated stresses are caused by the material being bent around a sharp corner and the material is kept at substantially the natural angle for the full length of the fitting.

It will be noted that the end fitting engages the balloon over a considerable area of the material. For the balloon described above in detail over 3½ square inches of material are firmly pressed between the end fitting surfaces. The present fitting can be more firmly attached to the balloon than heretofore thought possible and with smaller unit pressure between the material and fitting. This construction of course also reduces the chance of stress concentrations which exceed the yield point or ultimate strength of the material. At the upper end of the balloon, the material, being drawn outwardly by the expansion of the balloon, tends to force the fitting to slip off the balloon end. At the lower end the weight of the load has a similar effect. These factors, combined with the somewhat slippery nature of thin thermoplastics, such as polyethylene, make the fitting of the present invention especially advantageous because of its excellent gripping abilities.

With the structure described, the fitting attaches to the balloon very securely, which is important, since the lower fitting not only seals the balloons but also is depended upon to support the entire payload. The fittings of the top and bottom of the balloon are made of the same size so that they may be used interchangeably and are very strong and light weight which makes them very suitable for balloon use.

I have, in the drawings and specification, presented a detailed disclosure of the preferred embodiments of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A balloon which may be inflated with a lifting gas for carrying a load to high altitudes comprising a balloon envelope having an opening at the top and bottom ends, means for clamping together the top end comprising a pair of conically shaped clamping members and an annular ring having conically shaped inner surfaces at each end with the smallest diameter of the surfaces toward the center, the upper end of the balloon envelope being drawn through the ring and means to draw the pair of clamping members into the ring to clamp the balloon material and seal the end of the balloon envelope, and means for clamping the lower end of the balloon comprising a second pair of similar conically shaped clamping members, and a second similar ring with the lower end of the balloon drawn therethrough, means for drawing the second pair of conically shaped members into the sleeve to clamp the balloon envelope, and a load supporting element secured to the clamping means for the lower end of the balloon and adapted for connection to a load to support the load from the lower end of the balloon.

2. In a balloon which may be inflated with a lifting gas for carrying a load aloft and which has an upper end and a lower end at least one of which ends having an opening, a clamp for closing the end comprising a ring with the inner surfaces tapering toward the center, and a pair of conical clamping members shaped to conform to the inner surfaces of the ring, and a tightening member extending axially through the conical clamping members drawing the clamping members together to clamp the balloon material against the inner wall of the ring.

3. In a balloon which may be inflated with a lifting gas for carrying a load aloft which has an upper end and a lower end to be closed with clamps, the clamps comprising a pair of rings of the same size having the ends conically tapered inwardly toward the center, and four conically shaped clamping members of the same size provided with axial bores, and a first bolt adapted to extend through two of the clamping members to draw them against the inner surface of one ring to clamp the balloon material therebetween, and a second bolt adapted to extend through the bores of the other two clamping members and receive a nut to draw them against the inner surface of the other ring, the second bolt having an eye at one end for the attachment of a load to the balloon.

4. In a balloon which may be inflated with a lifting gas for carrying a load aloft and which has an upper end and a lower end to be closed with end fittings, one of the end fittings comprising an annular holding ring formed of fiber glass and a pair of clamping members formed of wood and being of a size to firmly clamp the balloon material to the inner surface of the ring when drawn into the ring ends, and means to draw the wooden clamping members together into the ring to clamp the balloon material and secure the balloon end.

5. A balloon for carrying a load to high altitudes comprising a balloon envelope of light weight non-extensible material, and originally being open on the top and bottom with the edge of the top and bottom openings joined by a heated thermoplastic weld, clamping members for both the top and bottom ends comprising a ring, and a pair of conically shaped clamping members to cooperatively extend into the ends of the ring to clamp the material, and means to draw the conically shaped clamping members into the ring to securely clamp the material.

6. In a balloon which may be inflated with a lifting gas for carrying a load aloft wherein the balloon envelope is formed from a length of tubular material, closing devices for the ends comprising a first closing device for the top end and a second closing device for the bottom end including a ring for surrounding the balloon material to clamp it together, the ring having inner surfaces tapering conically inwardly toward the center of the ring with the angle of the cone being substantially the same as the angle at which the balloon material tapers upwardly when the balloon is inflated, a pair of conically shaped clamping members with their conical surfaces having substantially the same angle as the inner surfaces of the collar, and means to draw the clamping members into the collar ends to clamp the balloon material against the inner surfaces of the ring and seal the balloon.

7. A fitting for securing a balloon end comprising an annular securing ring having an inner face against which the balloon material is placed, the end of the balloon extending through said ring, a clamping member which may be located inside the balloon material to press against the inner surface of the balloon material to hold it against said inner face of the ring, and means drawing the clamping member toward the annular ring to clamp the balloon material therebetween, the angle of the surface of the clamping member which engages the balloon being different with respect to the vertical balloon axis from the angle of the surface of the annular ring which engages the balloon.

8. A fitting for securing the end of a balloon comprising an annular holding ring through which the end of a balloon may be inserted, said ring having an inner face which tapers outwardly and against which the balloon material is pressed, the balloon material arranged uniformly around the inner surface of the ring, a clamping member which may be positioned inside the balloon and pressed toward the annular holding ring to compress the balloon material against said inner face, the clamping member having a conically shaped outer face which presses the material outwardly, the radial distance between the inner face of the holding ring and the outer face of the clamping member decreasing outwardly from the balloon axis so that thinner balloon material at the outer edge of the ring will be compressed with the same pressure as the thicker balloon material toward the center of the ring, and means to draw the clamping member toward the annular holding ring.

9. A fitting for securing the end of a balloon and supporting a load from the balloon comprising an annular ring surrounding the balloon material at the lower end of the balloon, the annular ring having inner faces which diverge outwardly from the mid-portion of the ring, a first clamping member to be located within the balloon and pressed toward the upper diverging surface of the annular ring, a second clamping member to be pressed upwardly toward the lower diverging surface of the annular ring, means to draw the clamping members together toward said diverging surfaces to clamp the balloon material thereagainst, said clamping members being frustum shaped to have surfaces which diverge outwardly to be complementary to the inner surfaces of the holding ring, the angle between the surface of the upper clamping member and the vertical axis of the balloon being greater than the angle between the upper inner surface of the annular ring and the vertical axis of the balloon so that the balloon material will be clamped between said surfaces with a uniform pressure.

10. A method of making an end fitting for securing a balloon, the end fitting having inner frustum shaped surfaces against which a clamping member may clamp the balloon material, the method comprising wrapping successive layers of fiber glass tape against opposed frustum shaped die members, applying an adhesive to the fiber glass tape, simultaneously continuing to wrap the fiber glass tape around the die members until a substantial layer of material is formed thereagainst, and subsequently separating the die members to release the annular ring with the inner frustum surfaces formed against the die members.

11. A fitting for securing the end of a balloon comprising a holding ring through which the material of the balloon is drawn, the holding ring having an upper and lower inner clamping surface against which the balloon material may be drawn, a first clamping member which may be located within the balloon to press the material up against the ring, said first clamping member having a pressing surface complementary to the upper surface of the annular ring, and a second clamping member also having a pressing surface to cooperate with the lower surface of the annular holding ring to press the material thereagainst, said first and second clamping members provided with a hole extending axially with respect to the annular ring, the hole of the first clamping member being threaded, and a bolt extending through said holes and threaded into the hole in the first clamping member to draw the clamping members together against the annular ring to clamp and seal the balloon.

12. A fitting for securing the end of a balloon comprising an annular holding ring through which the end of the balloon may be drawn, a first clamping member to be inserted within the balloon and brought down against the holding ring to clamp the material thereagainst, a second clamping member to be brought up against the holding ring to clamp the balloon material thereagainst, an axial opening through said clamping members, a securing member extending through said axial opening to draw the clamping members together, a central opening through said securing means leading to the interior of the balloon and providing means for inflating the balloon, and means operatively connected to said clamping member to support a payload from the balloon.

13. A balloon which may be inflated with a lifting gas comprising a balloon envelope with an upper and a lower end with at least one end having an opening to be closed, a ring surrounding the gathered material of said open end, a clamping member positioned against said ring and pressing the balloon material against the inner surface of the ring, and forcing means operatively associated with the ring and clamping member to force the clamping member against the inner surface of the ring to securely clamp the balloon material between the ring and clamping member.

14. A fitting for securing the end of a balloon comprising an annular holding ring through which the balloon end may be drawn, the ring having an inner surface which converges downwardly at an angle of 30° with the vertical axis of the balloon, the balloon material being pressed against said surface, a clamping member having an outer surface diverging upwardly at an angle of 38° with the balloon axis to correspond to the angle of the lower end of the balloon, the clamping member pressing the balloon material against the ring, and means associated with the ring and clamping member to force the clamping member toward the ring to press the balloon material therebetween.

15. A fitting for securing the end of a balloon comprising an annular holding ring through which the balloon end may be drawn, the ring having an inner surface which converges downwardly at an angle with the vertical axis of the balloon, the balloon material being pressed against said surface, a clamping member having an outer surface diverging upwardly at an angle with the balloon axis to correspond to the angle of the lower end of the balloon, the clamping member pressing the balloon material against the ring, and means associated with the ring and clamping member to force the clamping member toward the ring to press the balloon material therebetween.

References Cited in the file of this patent
UNITED STATES PATENTS

| | | |
|---|---|---|
| 437,289 | Clark | Sept. 30, 1890 |
| 1,495,000 | Cuthbertson | May 20, 1924 |
| 1,890,726 | Farren | Dec. 13, 1932 |
| 2,111,731 | Reach | Mar. 22, 1938 |
| 2,218,856 | Roessner | Oct. 22, 1940 |
| 2,355,610 | Tuggle | Aug. 15, 1944 |
| 2,409,486 | Hagen | Oct. 15, 1946 |